United States Patent [19]

Dickerson et al.

[11] Patent Number: 4,556,492
[45] Date of Patent: Dec. 3, 1985

[54] DEOXYGENATION PROCESS

[75] Inventors: Richard C. Dickerson; William S. Miller, both of Virginia Beach, Va.

[73] Assignee: Ecolochem, Inc., Norfolk, Va.

[21] Appl. No.: 562,001

[22] Filed: Dec. 16, 1983

[51] Int. Cl.$^4$ .............................................. C02F 9/00
[52] U.S. Cl. ...................................... 210/668; 210/669
[58] Field of Search ................................ 210/668–670, 210/673, 677, 678, 692, 694, 195.1, 202, 205, 259, 266, 269, 275, 284, 294, 295, 902, 241, 757

[56] References Cited

U.S. PATENT DOCUMENTS

| | | | |
|---|---|---|---|
| 3,736,253 | 5/1973 | De Angelis et al. | 210/668 |
| 3,764,548 | 10/1973 | Bedmore | 252/188 |
| 3,808,138 | 4/1974 | Yamaguchi et al. | 252/188 |
| 3,929,682 | 12/1975 | Kuhrt et al. | 252/466 |
| 3,962,113 | 7/1976 | Schiessl et al. | 252/188 |
| 4,098,691 | 7/1978 | Filby | 210/668 |
| 4,124,500 | 11/1978 | Arghiropoulos et al. | 210/59 |
| 4,218,315 | 8/1980 | Hartkorn | 210/668 |
| 4,269,717 | 5/1981 | Slovinsky | 210/750 |
| 4,287,072 | 9/1981 | Beecher | 210/668 |
| 4,289,645 | 9/1981 | Muccitelli | 252/188 |
| 4,363,734 | 12/1982 | Slovinsky | 210/750 |
| 4,383,920 | 5/1983 | Muller et al. | 210/87 |
| 4,399,098 | 8/1983 | Cuisia | 422/13 |

OTHER PUBLICATIONS

"Guide to the Design of Secondary Systems and Their Components to Minimize Oxygen–Induced Corrosion", prepared by Bechtel Group, Inc., Mar. 1982, pp. 4–28 to 4–34.
"The use of Active Carbon with Hydrazine in the Treatment of Boiler Feed Water", F. R. Houghton, International Water Conference, Bournemouth, England, pp. 54–58.
"Use of Hydrazine in Feedwater for High-Pressure Boilers," by Camillo Zanchi, Il Calore, 1954, (English translation).
"Impiego Dell; Idrazina Nell'Acqua D'Alimento Delle Caldaie Ad Alta Pressione; by Camillo Zanchi; pp. 264 through 270 of Il Calore (1954), No. 6.
"Hydrazine as an Oxygen Scavenger", by S. R. M. Ellis, Chemical & Process Engineering, Feb. 1956, pp. 47–50.

Primary Examiner—Ivars Cintins
Attorney, Agent, or Firm—Lane and Aitken

[57] ABSTRACT

A deoxygenation process includes the steps of adding hydrazine to a liquid containing dissolved oxygen, passing the liquid through a bed of activated carbon to catalyze a reaction between the dissolved oxygen and hydrazine whereby carbon contaminants are added to the liquid, and removing the contaminants. In another embodiment, unreacted hydrazine that remains in the liquid following the catalysis is removed by passing the liquid through an ion exchange resin. In still another embodiment, an activated carbon-catalyzed deoxygenation process employing hydrazine is practiced on a mobile platform and the process further includes the steps of transporting the apparatus to a regenerating station for regeneration. The invention also includes apparatus for carrying out the process.

18 Claims, 3 Drawing Figures

DEOXYGENATION PROCESS

BACKGROUND OF THE INVENTION

1. Field of the Invention

This invention pertains to a process for removing dissolved oxygen from liquids.

2. Background of the Invention

Processes for the removal of dissolved oxygen from liquids have applications in many diverse fields. In a number of industries, including those of beverage making, electronics, aerospace, deep well injection, and power generation, water is used in great quantities and the presence of unsatisfactory levels of dissolved oxygen can present numerous problems, including inferior product quality and damaged process equipment. As one example, dissolved oxygen contained in hot water that is circulated through power generating equipment and the like is a major cause of corrosion. Because of the enormous costs of replacing corroded power generating equipment parts, unsatisfactory levels of dissolved oxygen cannot be tolerated.

In prior art deoxygenation processes, hydrazine has been used as a strong reducing agent to prevent corrosion and other problems associated with oxygenated water. A small amount of hydrazine is added to the water to react with the dissolved oxygen to form nitrogen and water. In the field of power generation, a small amount of hydrazine is also provided in the deoxygenated water as it circulates in the power generating equipment. The circulating hydrazine and water mixture is said to cause the formation of magnetite on metal surfaces of the equipment by the reaction of hydrazine with iron, and the magnetite in turn helps protect against corrosion. Hydrazine also reduces red iron oxide deposits that typically form in power generating equipment and impede heat transfer and cause tubes to rupture. The product of this reduction reaction is magnetite which will settle to the bottom of a water stream and which can thereby be effectively and economically removed from generating equipment.

It is known that the reaction of hydrazine with dissolved oxygen can be catalyzed by passing the hydrazine and water mixture through a bed of activated carbon. Such a catalyzed deoxygenation process is described in F. R. Houghton, et al, "The Use of Activated Carbon With Hydrazine in the Treatment of Boiler Feedwater", International Water Conference, Bournemouth, England (1957) on pages 54–58, wherein boiler feedwater containing between 5 and 7 parts per million of dissolved oxygen is dosed with hydrazine in an amount of from 30 to 70% over the stoichiometric amount necessary to react with the dissolved oxygen. The dosed water is subsequently passed through a bed of activated carbon and then fed directly into a boiler.

Despite the advantages that one skilled in the art might expect from the catalyzation of a deoxygenation reaction, the prior art teachings of activated carbon catalysis of hydrazine deoxygenation have been almost completely ignored by the art due to a number of disadvantages inherent in the prior art processes.

A first disadvantage of the catalyzed deoxygenation processes of the prior art arises from the introduction of impurities, such as unreacted hydrazine and carbon contaminants, into the deoxygenated liquid. In the process of removing dissolved oxygen, the prior art systems leave levels of unreacted hydrazine that cannot be tolerated when a liquid such as water is used in certain sophisticated equipment or for the production of refined products. Among other unsatisfactory effects, unreacted hydrazine can raise the conductivity and the pH of the deoxygenated water to unsatisfactory levels. The processes of the prior art also introduce carbon contaminants into the deoxygenated liquid and the presence of these contaminants likewise is intolerable when a deoxygenated liquid of high purity is required. In the field of power generation, for example, such impurities render the prior art processes useless in high pressure equipment and, as a result, the significant benefits of carbon-catalyzed water deoxygenation have been unavailable to the art.

Even when a certain amount of unreacted hydrazine is desirable in the deoxygenated water for the purpose of inhibiting corrosion during circulation in power generating apparatus, the prior art processes are inadequate in that no provisions are made for effectively adjusting the amount of unreacted hydrazine remaining after deoxygenation in order to provide the optimum amount of hydrazine in the circulating water. Thus, in selecting an optimum amount of hydrazine to be reacted during the deoxygenation stage, a residual amount of unreacted hydrazine can result which will be either higher or lower than the optimum amount for the circulating stage. If the amount during the circulating stage is too low, the anticorrosive effects of the hydrazine are lost, and if the amount during the circulating stage is too high, the pH and conductivity of the circulating water can be raised to unacceptable levels. Some prior art processes have attempted to remedy this defect when the residual amount of unreacted hydrazine is too low by simply providing a means for adding hydrazine before the circulating stage. However, this type of arrangement fails to remedy the defect when the amount is too high and, further, completely fails to allow the flexibility needed to enable one to use a different anticorrosive agent than hydrazine in the circulating stage.

Still another shortcoming of the prior art is the failure to fully appreciate and address the hazards associated with hydrazine. Not only does hydrazine present a severe explosion hazard, especially when exposed to heat or oxidizing materials, but it is also highly toxic by ingestion, inhalation, and even skin absorption, and is a strong irritant to skin and eyes. Unconfirmed reports link hydrazine to cancer. In the prior art, no special precautions have been suggested for the handling of hydrazine used in deoxygenation processes nor for the handling of material beds that contain hydrazine.

Thus, there is a long-felt and unresolved need for an improved carbon-catalyzed deoxygenation process employing hydrazine that can be used commercially in a variety of applications. Ideally, the process would secure for the art all of the advantages that catalyzation of a reaction normally provides without prohibiting its use due to all of the incumbent disadvantages discussed hereinabove. To the fulfillment of this need and to other objectives that will become apparent from the following, the present invention is directed.

SUMMARY OF THE INVENTION

This invention is a deoxygenation process that includes the steps of adding hydrazine to a liquid containing dissolved oxygen, passing the liquid through a bed of activated carbon to catalyze a reaction between the dissolved oxygen and hydrazine whereby carbon contaminants are added to the liquid, and removing the contaminants. In another embodiment, unreacted hydrazine that remains in the liquid following the catalysis is removed by passing the liquid through an ion exchange resin. In still another embodiment, an activated carbon-catalyzed deoxygenation process employing hydrazine is practiced on a mobile platform and the process further includes the steps of transporting the apparatus to a regenerating station for regeneration. The invention also includes apparatus for carrying out the process.

DESCRIPTION OF THE PREFERRED EMBODIMENTS

Figure 1:
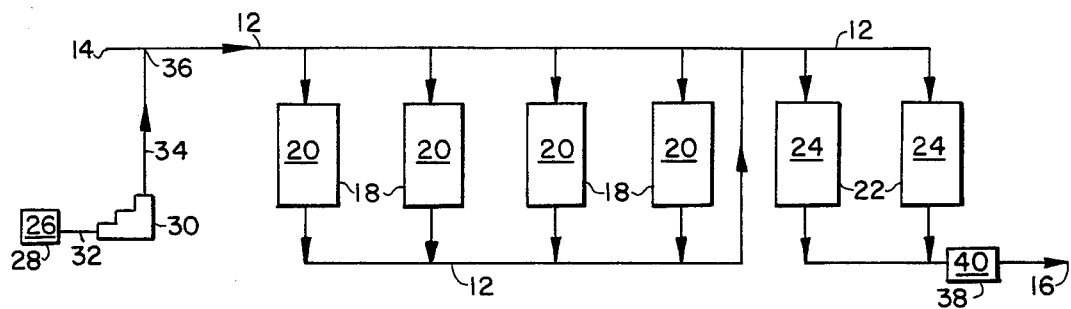
FIG. 1 is a schematic diagram depicting an apparatus in accordance with the invention.

As depicted in FIG. 1, the invention includes a conduit 12 that has an inlet 14 for receiving a stream of liquid containing dissolved oxygen and an outlet 16 for discharging liquid that has been deoxygenated. The conduit communicates with vessels 18 connected in parallel and containing activated carbon 20, so that liquid flowing through conduit 12 passes through the carbon as indicated by the arrows adjacent to the vessels. The conduit also communicates with vessels 22 that are connected in parallel and contain ion exchange resin 24, so that liquid flowing through the conduit also passes through the ion exchange resin. Before liquid passing through the conduit contacts the activated carbon, hydrazine 26 is pumped into the liquid from hydrazine tank 28 by means of hydrazine pump 30.

The liquid that is introduced into inlet 14 is demineralized or undemineralized and has a dissolved oxygen content of up to the saturation point of oxygen in the liquid for the prevailing temperature and pressure conditions. The liquid temperature can vary widely from just above the liquid's freezing point to a temperature that is just below the temperature at which the ion exchange resin would be damaged.

Hydrazine can be added through hydrazine pump 30 in a pure form or in an aqueous solution, but a solution is preferred in order to reduce or eliminate the explosion and fire hazards associated with concentrated hydrazine. Catalyzed or uncatalyzed hydrazine can be employed with beneficial results. Preferably, uncatalyzed hydrazine is used because of its lesser cost. Also, in the case of certain sophisticated power generating apparatus such as nuclear power generators, catalyzed hydrazine can cause residual catalysts such as cobalt to remain in the deoxygenated water and such catalysts can damage the generating apparatus. In a preferred embodiment, Scav-ox, a 35% aqueous solution of uncatalyzed hydrazine distributed by Olin Chemical Company, is used.

Hydrazine pump 30 is any conventional means for dispensing a measured amount of fluid. The interior surfaces of the pump, as well as conduits 32 and 34 which are contacted by the hydrazine solution, are selected from materials such as stainless steel that are not damaged by the strong reducing property of the hydrazine.

It is necessary only to use enough hydrazine to completely react with the dissolved oxygen contained in the liquid. It has been found, in the present invention, that hydrazine in an amount of only about 10 to about 20% more than a stoichiometric amount is needed to completely react with the oxygen. By reducing the amount of hydrazine necessary to practice the invention, relative to prior art processes, a significant advantage is realized in that the cost of the hydrazine is reduced and less hydrazine needs to be handled so that the dangers associated therewith are reduced.

It is important that no processing apparatus that would eliminate the hydrazine is disposed between the point 36 at which hydrazine is added to conduit 12 and activated carbon beds 18. The mixture of hydrazine and liquid is passed through activated carbon 20 to catalyze the reaction between the dissolved oxygen and hydrazine. The activated carbon can be any commercially available activated carbon and in a preferred embodiment WV-G activated carbon distributed by Westvaco of Covington, Va. is used.

As a result of the mixing of the liquid with hydrazine and the subsequent contact with the carbon beds, the deoxygenated liquid leaving vessels 18 typically contains an amount of unreacted hydrazine and carbon contaminants. The unreacted hydrazine is present because an excess over the stoichiometric amount of hydrazine is beneficially reacted with the liquid, as indicated above. Also, because the dissolved oxygen content of the incoming liquid may vary, as when the liquid is water from a storage tank or utility source, the amount of unreacted hydrazine will vary when a fixed amount of hydrazine, unresponsive to the varying dissolved oxygen content, is added at point 36.

The carbon contaminants are present because the liquid washes them from the carbon bed as it passes through. The carbon contaminants can include a wide variety of substances that are detrimental when a high quality deoxygenated liquid is required. Many carbonaceous raw materials, such as wood, coal, nutshells, and petroleum coke, are used for the manufacture of activated carbon and the contaminants vary depending upon the raw material used. Regardless of which raw material is used, the contaminants are likely also to include carbon fines.

When the end use of the deoxygenated liquid requires that the unreacted hydrazine be removed, ion exchange resin 24 is selected from the group consisting of mixed bed resin and cation resin. If a mixed bed resin is employed, it consists of any commercially available strong acid cation exchange resin, such as Ionac C-249, and any commercially available strong base anion exchange resin, such as Ionac ASB-1. The Ionac resins are manufactured by Sybron Corporation of Birmingham, N.J. If a cation exchange resin alone is used, it is any commercially available strong acid cation exchange resin such as Ionac C-249.

Ion exchange resin 24 typically does not filter out all of the carbon fines contained in the deoxygenated water. To effect their removal, filter 38 containing filter media 40 is disposed in communication with conduit 12 between vessels 22 and outlet 16. The size of the filter media particles is selected to prevent passage of the fines, and it has been found that a media particle size of 100 microns or less is suitable for this purpose. In a preferred embodiment, at least some of the carbon fines are also removed by pre-washing the activated carbon. The activated carbon can be prewashed with water that has not been demineralized, but the minerals of the water are typically adsorbed by the carbon and can be released as contaminants when the deoxygenation process is practiced. Preferably, the pre-wash is undertaken with demineralized water to eliminate this problem.

From the foregoing, it will be appreciated that by selecting a mixed bed resin, both the unreacted hydrazine and certain of the carbon contaminants are removed. Thus, when the end use requires the removal of both hydrazine and contaminants, the use of a mixed bed resin is preferred. For similar reasons, another embodiment involves the use of a cation resin vessel and an anion resin vessel in a series relationship and in communication with conduit 12 downstream of vessels 18.

In accordance with the invention depicted in FIG. 1, both the unreacted hydrazine and carbon contaminants are economically and efficiently removed. Even in certain applications where a predetermined amount of unreacted hydrazine in the deoxygenated liquid is desirable, the complete removal of hydrazine in accordance with the present invention is beneficial because it is then possible to add the desired amount of hydrazine without the need for constantly monitoring the amount of residual hydrazine from the deoxygenation process and compensating therefor. In the field of power generation, the complete removal of hydrazine is also advantageous when it is desired to use an anti-corrosive agent for circulating through the generating apparatus that is different from hydrazine.

Figure 2:
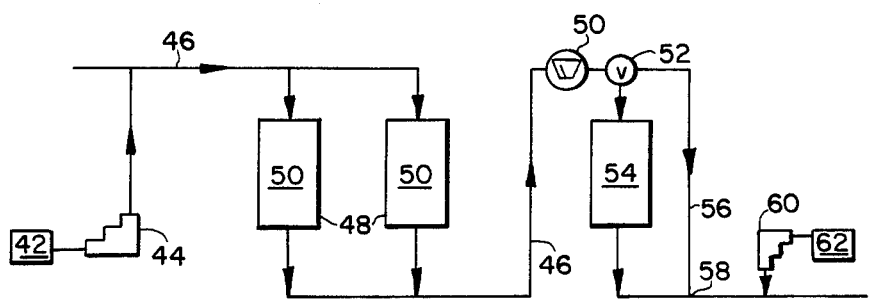
FIG. 2 is a schematic diagram depicting an apparatus in accordance with a second embodiment of the invention, wherein a bypass is provided around one or more vessels.

FIG. 2 depicts an embodiment which offers an alternative to first removing all of the unreacted hydrazine and then adding back the desired amount. In this embodiment, hydrazine 42 is pumped by pump 44 into conduit 46 where it is mixed with water containing dissolved oxygen. The water and hydrazine are passed through vessels 48 which contain activated carbon 50, and the amount of hydrazine remaining in solution after leaving vessels 48 is measured by chemical analyzer 50. The analyzer regulates valve 52 such that, when the amount of unreacted hydrazine is greater than the amount ultimately desired in the effluent, the valve diverts at least a percentage of the water from bypass conduit 56 through ion exchange resin 54. The hydrazine in the percentage directed through resin 54, contrary to that in the percentage directed through conduit 56, is removed and by regulating the amounts of the two percentages, the amount of hydrazine remaining per unit volume of effluent at point 58, where the two percentages are recombined, is efficiently and precisely regulated.

When the amount of unreacted hydrazine detected by analyzer 50 is less than the amount ultimately desired in the effluent, second hydrazine pump 60 can be energized by analyzer 50 to introduce a quantity of hydrazine 62 sufficient to arrive at the ultimately desired amount. However, the need for adding hydrazine is preferably eliminated by adding a sufficient amount of hydrazine 42 such that there will always be an amount detected by analyzer 50 that is equal to or greater than that ultimately desired.

The hazards of hydrazine have been noted above and certain of these hazards remain even where hydrazine is present in a dilute aqueous solution. For example, when a hydrazine solution is passed through an activated carbon bed and ion exchange resin beds, a residue of unreacted hydrazine can remain in the beds and handling of the beds can cause health hazards. When such handling is done by inexperienced persons at the site where the deoxygenated liquid is needed, the health hazards are multiplied.

Figure 3:
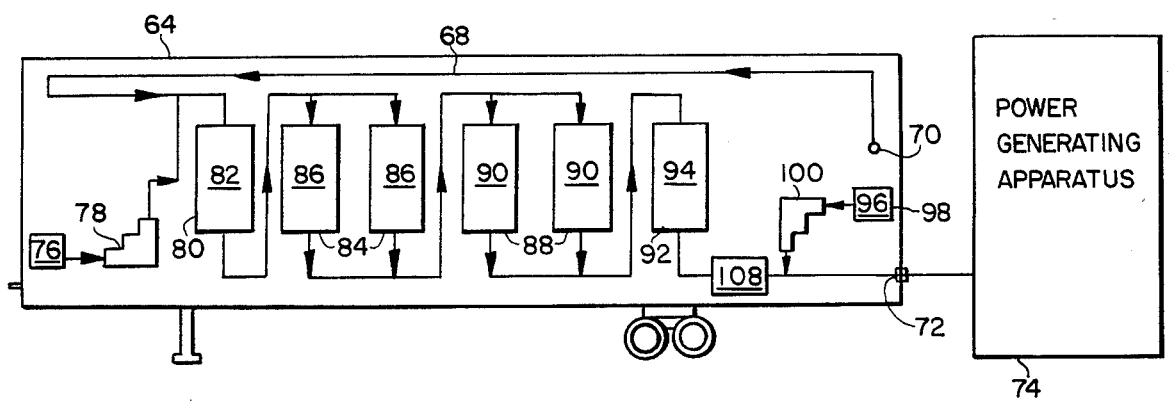
FIG. 3 is a schematic diagram depicting an apparatus in accordance with a third embodiment of the invention, wherein the invention includes an enclosed, mobile platform.

In the embodiment depicted in FIG. 3, the hazards associated with the use of hydrazine in a deoxygenation process have been reduced or eliminated. In this embodiment, apparatus for deoxygenating water is disposed on a mobile, enclosed platform 64.

The apparatus contained on the mobile platform is similar to that depicted in FIG. 1. In FIG. 3, the apparatus includes a conduit 68 for carrying water that initially contains dissolved oxygen. The conduit has an inlet 70 which is releasably attached to a water supply and an outlet 72 which is releasably connected to a power generating apparatus 74. After being introduced into the conduit, feed water passes to one end of the platform and hydrazine 76 is pumped into conduit 68 by pump 78. The water and hydrazine mixture is then passed through vessel 80 which contains activated carbon 82. Then, the water passes through vessels 84 which contain cation exchange resin beds 86 and through vessels 88 which contain anion exchange resin beds 90 to remove any unreacted hydrazine and carbon impurities and to demineralize the feed water. The water is then passed through vessel 92 which contains a polisher 94. Adjacent to outlet 72, hydrazine 96 contained in a second hydrazine container 98 can be added to the feed water by means of hydrazine pump 100. Since no unreacted hydrazine remains in the feed water at the point at which pump 100 communicates with conduit 68, apparatus for measuring the unreacted hydrazine content is unnecessary and an amount of hydrazine can be uniformly added which is optimum for use in the circulation stage. Filter 108 removes carbon fines that pass through the ion exchange resin beds.

Numerous advantages flow from the arrangement of the parts of the invention depicted in FIG. 3. To begin with, the mobile, enclosed platform 64 allows the structure embodying the hydrazine and related apparatus to be set apart from the main structure that houses the power generating apparatus. In this fashion, hazards associated with the hydrazine are minimized.

Another important feature of the embodiment depicted in FIG. 3 is that platform 64 is mobile. Thus, after an amount of water has been deoxygenated and the activated carbon and resins need to be regenerated or replaced, the trailer can be transported to a regeneration station, where specialized equipment and employees can regenerate the apparatus with minimal risks. In this way, employees at the power generating plant or other site of use avoid contact with hydrazine fumes and hydrazine deposits remaining in the activated carbon and other resins.

The following examples specifically illustrate the practice of the present invention. Suitable vessels, valves, conduits and accessory equipment for practicing the present invention are described in U.S. Pat. No. 4,383,920, and said patent is hereby incorporated by reference.

EXAMPLE 1

In accordance with the present invention, oxygen is removed from a two-step demineralizer effluent containing about 8 to 10 parts per million of dissolved oxygen. The effluent is introduced at a rate of 110 to 540 gallons per minute, usually 500 GPM, into an apparatus comprising a hydrazine pump, six activated carbon tanks connected in parallel, and six mixed bed tanks connected in parallel.

A 35% solution of hydrazine is added to the effluent at a ratio of 0.4 gallons per hour of hydrazine solution per 100 GPM of effluent. During the first 3.5 hours, the system yields a product having less than 0.1 ppm dissolved oxygen and the feed rate of the hydrazine solution is gradually reduced to 0.2 GPH per 100 GPM effluent. After 36 hours of successful performance at this feed rate, the rate is gradually reduced to 0.15 GPH of hydrazine solution. In this example it has been found that, on average, the introduction of about 8.9 ppm of hydrazine to the effluent is sufficient.

After introduction of the hydrazine solution, the effluent is then passed through the activated carbon tanks. Each tank contains a 60 cubic foot bed of activated carbon for a total of 360 cubic feet of carbon. The effluent is then passed through the mixed bed tanks, each of which contains 96 cubic feet of mixed bed resin for a total of 576 cubic feet.

The demineralized and deoxygenated product of Example 1 is found to contain less than 10 ppb dissolved oxygen and less than 1 ppb hydrazine. After a lengthy shutdown, dissolved oxygen content was found to be relatively high upon restart but this increased content was eliminated by temporarily increasing the feed rate of hydrazine.

EXAMPLE 2

In accordance with the present invention, oxygen is removed from either condensate or dimineralized makeup water containing from 0.5 ppb to 10 ppm dissolved oxygen and having a conductivity of 1 micromho. The influent is treated in an apparatus comprising a hydrazine pump, three activated carbon tanks connected in parallel, three mixed beds also connected in parallel, and a continuous oxygen monitor.

Influent is introduced into the apparatus at the rate of 130 to 470 GPM. The oxygen level of the influent varies and is high (several ppm) when treating demineralized makeup water and low (less than 1 ppm) when treating condensate.

A 35% solution of hydrazine is pumped into the influent stream upon its introduction into the apparatus. The flow rate of hydrazine solution is 0.2 GPH per 100 GPM of influent for the first 24 hours. Then, the flow rate is gradually diminished over the second 24 hour period to a minimum of 0.02 GPH per 100 GPM of 1 ppm dissolved oxygen stream. The stoichiometric relationship is 0.017 GPH of hydrazine solution per 100 GPM of an influent containing 1 ppm dissolved oxygen.

After hydrazine is introduced into the influent feed, the mixture is passed through the three activated carbon tanks. Each tank contains 60 cubic feet of activated carbon for a total of 180 cubic feet. The condensate is then passed through the three mixed beds, each of which contains 96 cubic feet of mixed bed resins for a total of 288 cubic feet. A continuous dissolved oxygen monitor measures the amount of dissolved oxygen in the treated effluent and the effluent is then transferred to a storage tank. The treated effluent is found to contain 2 to 19 ppb of dissolved oxygen. The conductivity of the influent which is 6 micromhos following passage through the carbon tanks, is reduced to less than 1 micromho, typically 0.2 micromho, after passage through the mixed beds.

Having thus described the present invention in detail, it will be apparent to those skilled in the art that modifications and additions can be made which are within the spirit and scope of the invention.

We claim:

1. A deoxygenation process comprising a first step of adding hydrazine to a liquid containing dissolved oxygen, a second step of passing said liquid through a bed of activated carbon to catalyze a reaction between said dissolved oxygen and said hydrazine whereby an amount of dissolved carbon contaminants are added to said liquid, and a third step of passing said liquid through an ion exchange resin selected from the group consisting of mixed bed resin and cation resin to remove at least said dissolved contaminants.

2. The deoxygenation process of claim 1, wherein an amount of undissolved contaminants are also added during said second step and said process further comprises a fourth step of passing said liquid through a filter media after said second step whereby at least said undissolved contaminants are filtered from said liquid.

3. The process of claim 1, further comprising the step of backwashing said activated carbon before said first step to reduce said amount of carbon contaminants.

4. The process of claim 3, wherein said backwashing step comprises backwashing with demineralized water.

5. The process of claim 1, wherein, after said second step, an amount of unreacted hydrazine remains in said liquid, and wherein said unreacted hydrazine is removed in said third step.

6. The process of claim 1, wherein said liquid is water.

7. The process of claim 6, further comprising the final step of circulating said deoxygenated water at elevated temperatures in a power generating apparatus.

8. A deoxygenation process comprising a first step of adding hydrazine to a liquid containing dissolved oxygen, a second step of passing said liquid through a bed of activated carbon to catalyze a reaction between said dissolved oxygen and said hydrazine whereby an amount of unreacted hydrazine remains in said liquid following said second step, and the third step of passing said liquid through an ion exchange resin selected from the group consisting of mixed bed resin and cation resin to remove at least a portion of said unreacted hydrazine.

9. The process of claim 8, wherein said liquid is water.

10. The process of claim 9, further comprising the final step of circulating said deoxygenated water at elevated temperatures in a power generating apparatus.

11. A deoxygenation process for providing a liquid having a predetermined amount of unreacted hydrazine comprising a first step of adding hydrazine to a liquid containing dissolved oxygen, a second step of passing said liquid through a bed of activated carbon to catalyze a reaction between said dissolved oxygen and said hydrazine whereby an amount of unreacted hydrazine remains in said liquid following said second step, a third step of providing an ion exchange resin selected from the group consisting of mixed bed resin and cation resin and a bypass conduit that bypasses said resin, and a fourth step of passing said liquid through said bypass conduit and diverting at least a portion of said liquid from said conduit to pass through said resin when said liquid contains more hydrazine than said predetermined amount.

12. The process of claim 11, further comprising a fifth step of adding hydrazine to said liquid from said second step when said liquid from said second step contains less hydrazine than said predetermined amount.

13. The process of claim 11, wherein said liquid is water.

14. The process of claim 13, further comprising the final step of circulating said water at elevated temperatures in a power generating apparatus.

15. A deoxygenation process comprising a first step of adding hydrazine to a liquid containing dissolved oxygen, a second step of passing said liquid through activated carbon to catalyze a reaction between said dissolved oxygen and said hydrazine, and a third step of substantially completely removing said hydrazine by passing said liquid through an ion exchange resin selected from the group consisting of mixed bed resin and cation resin.

16. The process of claim 15, wherein said liquid is water.

17. The process of claim 16, further comprising the final step of circulating said water at elevated temperatures in a power generating apparatus.

18. The process of claim 17, wherein, before said final step, a predetermined amount of a corrosion inhibiting substance is added to said water.

* * * * *